United States Patent [19]
Fannin et al.

[11] Patent Number: 6,079,769
[45] Date of Patent: Jun. 27, 2000

[54] RETRACTABLE AIR TURBULENCE DEVICE FOR VEHICLES

[76] Inventors: Dawn B. Fannin, 1802 N. 32$^{nd}$, Boise, Id. 83703; Roy W. Hansen, 13404 Bell Rd., Caledonia, Wis.

[21] Appl. No.: 09/258,930

[22] Filed: Mar. 1, 1999

[51] Int. Cl.$^7$ .................................................. B62D 35/02
[52] U.S. Cl. ..................................... 296/180.1; 296/180.2
[58] Field of Search ............................. 296/180.1, 180.2, 296/180.3, 180.4, 180.5; 180/903

[56] References Cited

U.S. PATENT DOCUMENTS

| | | | |
|---|---|---|---|
| 3,618,998 | 11/1971 | Swauger | 296/180.5 |
| 3,869,617 | 3/1975 | Gaussoin et al. | |
| 4,131,308 | 12/1978 | Holka et al. | |
| 4,159,140 | 6/1979 | Chabot et al. | |
| 4,262,953 | 4/1981 | McErlane | 296/180.4 |
| 4,313,635 | 2/1982 | Front | |
| 4,486,046 | 12/1984 | Whitney et al. | |
| 4,489,806 | 12/1984 | Shimomura | |
| 4,640,541 | 2/1987 | FitzGerald et al. | 296/180.1 |
| 4,758,037 | 7/1988 | Suzuki et al. | 296/180.1 |
| 4,951,994 | 8/1990 | Miwa | 296/180.1 |
| 5,205,058 | 4/1993 | Allen et al. | |

FOREIGN PATENT DOCUMENTS

| | | | |
|---|---|---|---|
| 1156293 | 11/1983 | Canada | 296/180.4 |
| 2633240 | 12/1989 | France | 296/180.1 |
| 2836006 | 3/1980 | Germany | 296/180.5 |
| 0132482 | 6/1991 | Japan | 296/180.3 |
| 747765 | 7/1980 | U.S.S.R. | 296/180.2 |
| 2051691 | 1/1981 | United Kingdom | 296/180.1 |
| 1593142 | 7/1981 | United Kingdom | 296/180.1 |

OTHER PUBLICATIONS

Commercial Car Journal, Sep. 1973, "Beat the Built–in Headwind", Sep. 1973.

*Primary Examiner*—Dennis H. Pedder
*Attorney, Agent, or Firm*—Hill & Simpson

[57] ABSTRACT

A moldboard structure is movably attached to the lower side of a vehicle frame at its front end or at a midframe location, and extends downwardly toward the ground surface. The moldboard structure has a central point and two lateral extensions with a lower edge. The moldboard extends outwardly and rearwardly from the central point at a sweepback angle of between 10° and 25° and preferably about 17° to the transverse axis. The moldboard extends transversely beyond the centerline of the tire of the immediately rearwardly positioned axle by a distance of at least about 0 to 9". A support affixes the moldboard structure to the frame. The support includes a mechanical linkage operable to move the moldboard between a lowered position wherein the lower edge of the moldboard is at a lowered distance of from about 1 to about 3" from the ground surface, and a raised position wherein the lower edge of the moldboard is at a raised distance from the ground surface that is greater than the lowered distance by about 7 to 11". A drive is operable to controllably move the moldboard between the lowered position and the raised position.

22 Claims, 9 Drawing Sheets

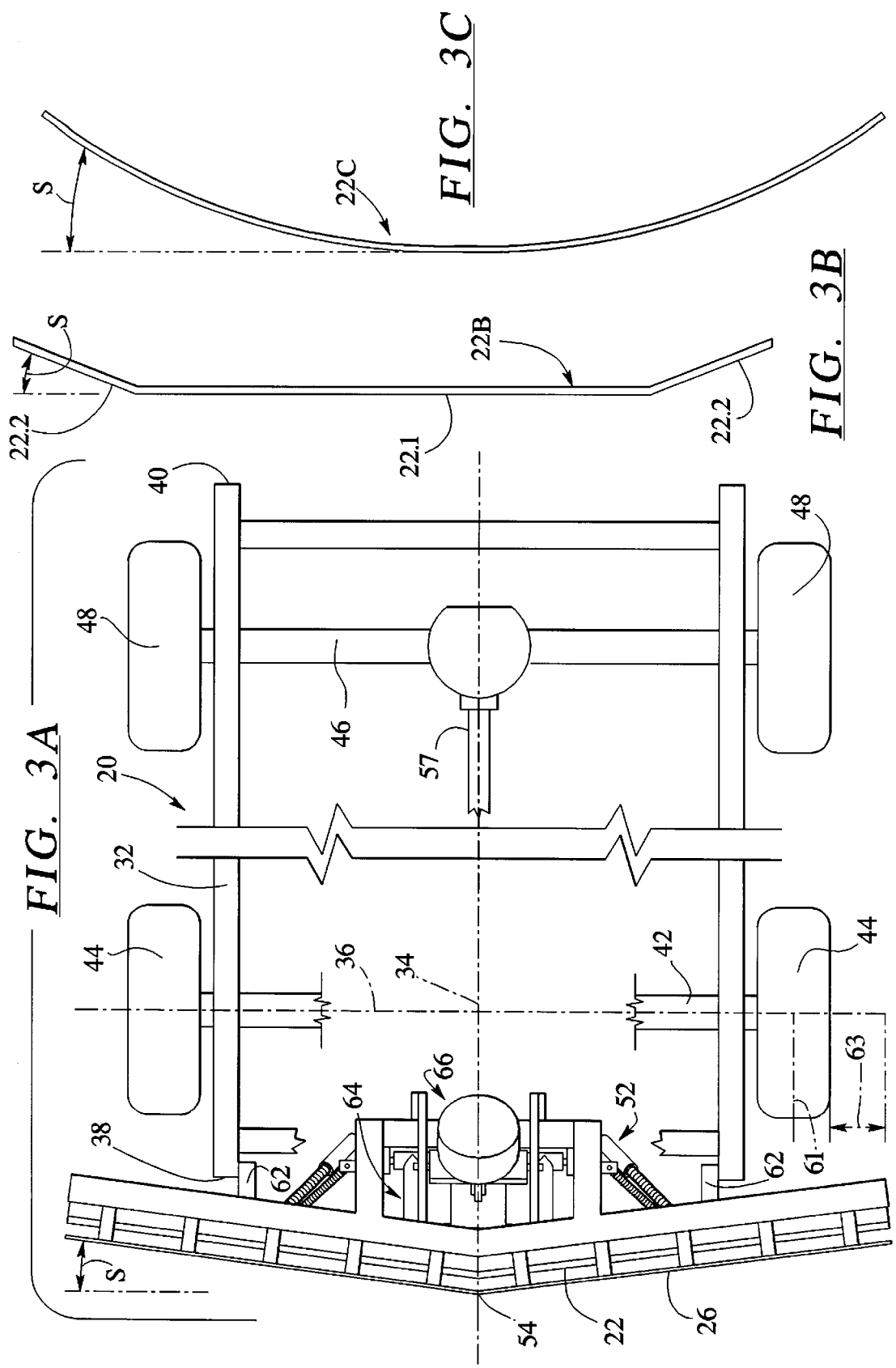

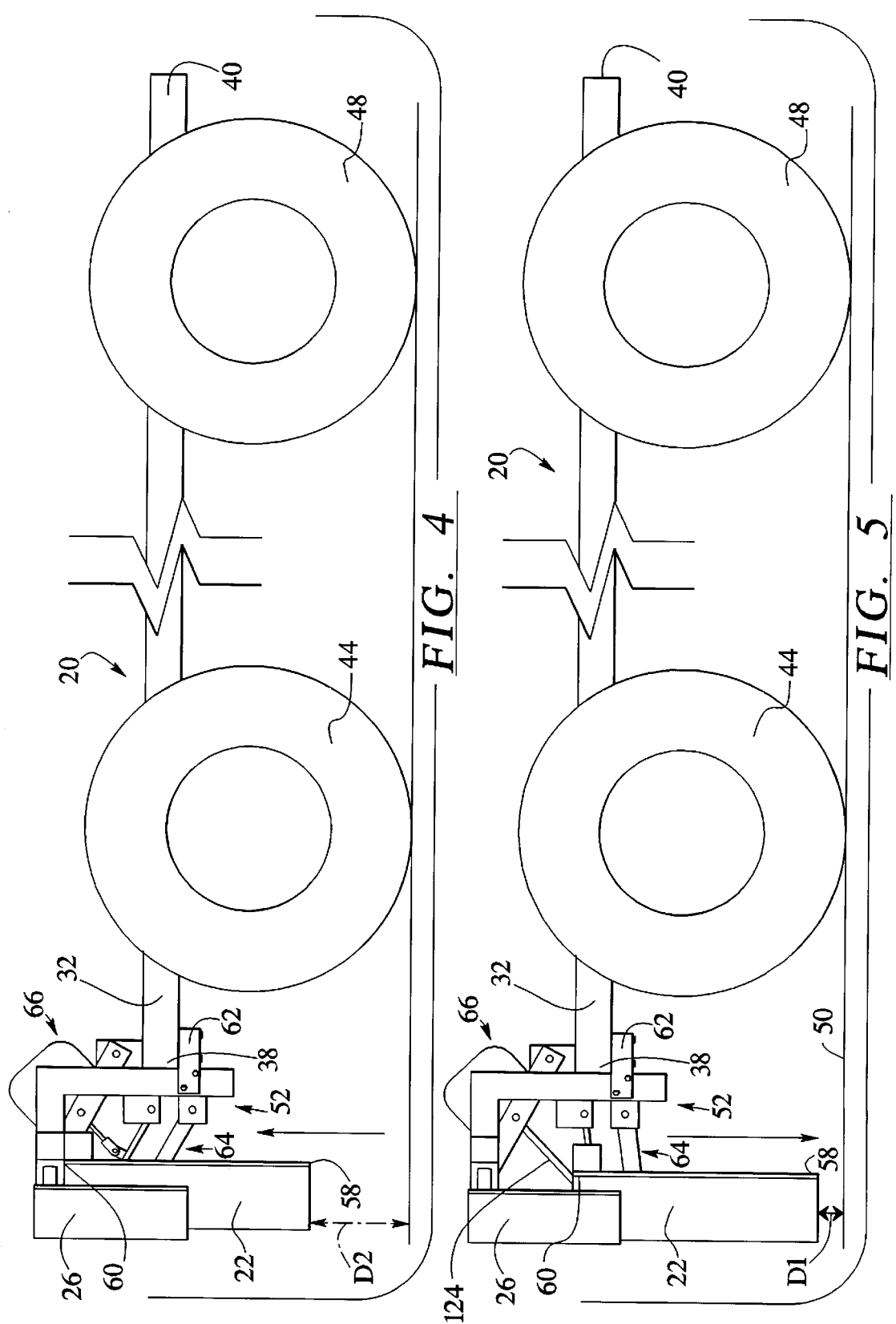

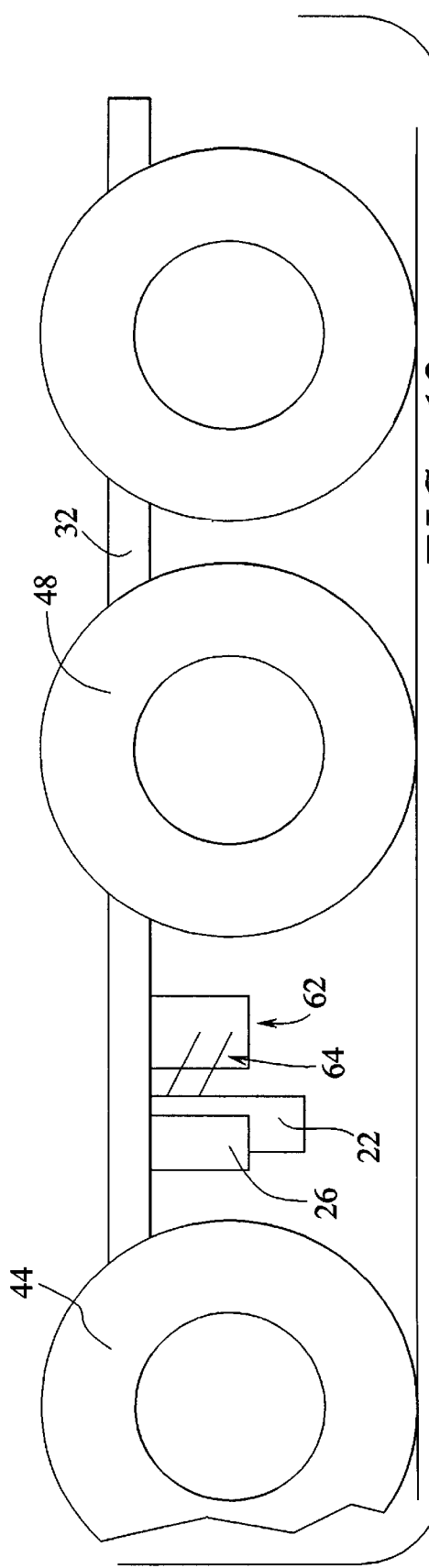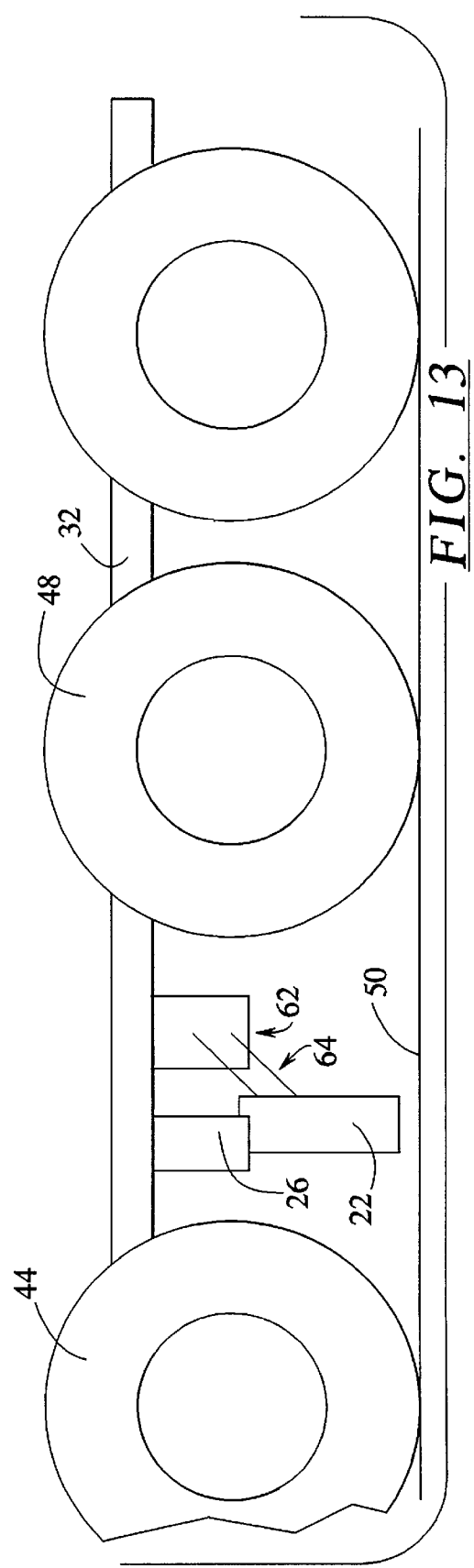

RETRACTABLE AIR TURBULENCE DEVICE FOR VEHICLES

BACKGROUND OF THE INVENTION

This invention relates to an aerodynamic device that controls the underbody air flow of vehicles.

As a car, truck or other vehicle travels along the road, it disturbs the air through which it passes. This air disturbance has important consequences for environment, reduction of energy consumption, safety, and road handling performance of the vehicle.

As to the environment, and energy consumption, overcoming the wind resistance and turbulence generated by the passage of the vehicle expends energy. That energy is supplied by the fuel of the vehicle. The greater the wind resistance and turbulence, the greater the expenditure of fuel and the lower the fuel economy. The increased fuel usage impacts the environment directly through increased emissions, and indirectly through increased demands for the production of fuel.

As to safety, the turbulence produced by vehicles, particularly large trucks, imposes sideways forces directly on passing vehicles, reducing their stability. The turbulence also results in decreased visibility during wet road conditions. Most drivers are familiar with the great amount of side spray produced by large trucks in rainy or snowy conditions, which can obscure visibility behind and to the sides of the truck.

The effects of aerodynamics on road handling performance of the vehicle are relatively minor for conventional vehicles, but it is quite noticeable for race cars. Race cars travel sufficiently fast that the aerodynamic lift generated by the passage through the air may reduce road contact load, leading to reduced control of the vehicle in corners.

The effects of aerodynamics, safety, and road handling performance have been recognized and addressed in the past. Vehicles are made with an aerodynamic upper body configuration to reduce wind resistance, consistent with other requirements of the vehicle. For example, in recent years overcab air deflectors on trucks used to pull trailers have become popular to reduce wind resistance. Rear spoilers are used to alter the aerodynamics of race cars and some production cars. Mud flaps and side guards are used to reduce side spray, although drivers will recognize that such devices are, at best, of limited value. Side spray remains a substantial highway safety problem. Some race cars use underbody air dams to alter the aerodynamic loadings, although the principles have not been successfully applied to highway vehicles.

Although these and other techniques have been used to alter the aerodynamics of highway vehicles, they have had only limited success. There remains a need for an approach for improving fuel mileage and reducing side spray safety problems. The present invention fulfills this need, and further provides related advantages.

SUMMARY OF THE INVENTION

The present invention provides an aerodynamic structure or moldboard structure for use in controlling underbody aerodynamics of a highway vehicle. The aerodynamic structure is usable on cars, trucks, buses, motor homes and other vehicles that operate on highways and encounter a range of uncontrollable conditions. The aerodynamic structure reduces underbody wind drag and turbulence, increasing fuel utilization and economy. It also alters the air flow under the vehicle so as to reduce side spray, leading to a significant improvement in visibility and highway safety in wet weather.

In accordance with the invention, a moldboard structure is used with a vehicle having a body including a frame having a longitudinal centerline axis and a transverse axis perpendicular to the longitudinal axis, and further having a front end and a back end. The body also includes a forward axle affixed to the frame parallel to the transverse axis, and a front tire at each end of the forward axle, and a rear axle affixed to the frame parallel to the transverse axis, and at least one rear tire at each end of the rear axle. The front and rear tires, along with potentially other tires, rest and roll on a ground surface. The moldboard structure comprises a moldboard having a central point and two side moldboard extensions, each with a lower edge, extending laterally outwardly on each side of the longitudinal centerline axis. The moldboard with the side extensions could be a single piece member or could be two separate members, depending on the location for mounting the moldboard and the characteristics of the vehicle the moldboard structure is being mounted to. In this description, the term "moldboard" will be used to refer to the entire width, whether a single member or two separate members. In one placement location, the moldboard structure is located forward of an adjacent axle. The moldboard extends outwardly and rearwardly from the central point at a sweepback angle of from about 10° to 25°, and more preferably about 15° to about 19°, and most preferably about 17°, to the transverse axis. The moldboard may be joined at the central point, or be unjoined. The moldboard extends transversely at least to the midpoint of the tire of the adjacent axle and up to a distance of about 6" beyond any part of the vehicle structure (including wheels, bumpers, etc.), and most preferably about 2" beyond the tire. The moldboard structure further includes a support affixing the moldboard structure to the frame. The moldboard structure includes a mechanical linkage operable to move the moldboard between a lowered position wherein the lower edge of the moldboard is at a lowered distance of about 1 to about 3" from the ground surface, and a raised position wherein the lower edge of the moldboard is at a raised distance from the ground surface that is greater than the lowered distance. A drive is operable to controllably move the moldboard between the lowered position and the raised position, typically from about 10" to about 12" above the ground surface. Preferably, a stationary air deflector, which is conformably shaped to the moldboard, is affixed to the frame at a location immediately forward of the moldboard, such that, when the moldboard is in the lowered position, a lower edge of the stationary air deflector overlaps an upper edge of the moldboard.

The support may be positioned on the front end of the vehicle frame, so that the moldboard structure is forward of the forward axle. In another embodiment, the support may be positioned at an intermediate location between the forward axle and the rear axle, so that the moldboard structure is forward of the rear axle.

The support that affixes the moldboard structure to the frame preferably attaches to a stationary support bar. A movable support bar is provided to which the moldboard is affixed. The mechanical linkage extends between the stationary support bar and the movable support bar. The drive extends between the frame and/or stationary support bar and the movable support bar. The mechanical linkage preferably is affixed in a hinged manner to the stationary support bar and is affixed in a hinged manner to the movable support bar. The drive may be, for example, a pneumatic drive, a hydraulic drive, or an electric drive.

In operation, the moldboard is moved into its lowered position. In conjunction with the stationary air deflector, where present, the moldboard reduces underbody turbulence. The result is reduced fuel expenditure and reduced air turbulence. Also in wet conditions, the result includes reduced side spray. The moldboard is moved to its raised position to clear obstacles, such as rocks or snow on the roadway. It may also be moved to the raised position for slow-speed, city driving where underbody turbulence and side spray are of little concern, and there is a greater likelihood of encountering objects which must be cleared by the moldboard. The drive may be controlled such that the position of the moldboard relative to the ground could be adjusted by automatic devices based on input factors such as temperature and vehicle speed. The position of the moldboard could be determined by various measuring devices such as infra-red detectors, sonic sensors, etc. Alternatively, the lower position of the moldboard could be preset and the moldboard could lower to a bottom most position each time it is used.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3A is a schematic plan view of the vehicle frame with the first embodiment of the structure affixed to the front end.

FIG. 3B is a schematic plan view of the structure alone.

FIG. 3C is a schematic plan view of the structure alone.

FIG. 4 is a schematic side elevational view of the structure of FIG. 3A, with the moldboard in the raised position.

FIG. 5 is a schematic side elevational view of the structure of FIG. 3A, with the moldboard in the lowered position.

FIG. 12 is a schematic side elevational view of the structure of FIG. 6, with the moldboard in the raised position.

FIG. 13 is a schematic side elevational view of the structure of FIG. 6, with the moldboard in the lowered position.

DETAILED DESCRIPTION OF THE PREFERRED EMBODIMENTS

Figure 2:
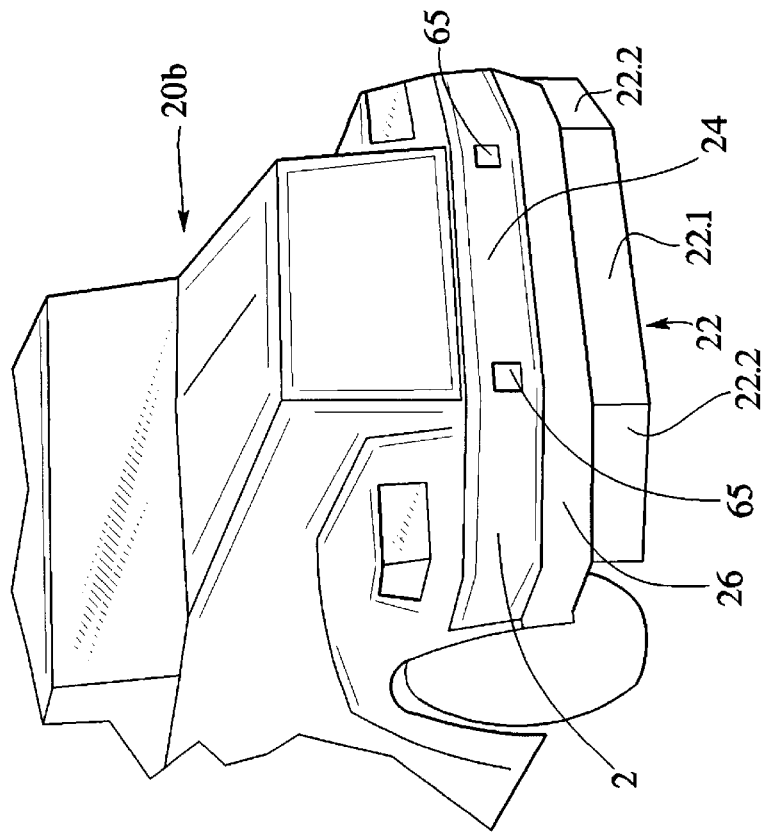
FIG. 2 is a perspective view of a second embodiment of the aerodynamic or moldboard structure affixed to the front end of a tractor/trailer truck.
Figure 1:
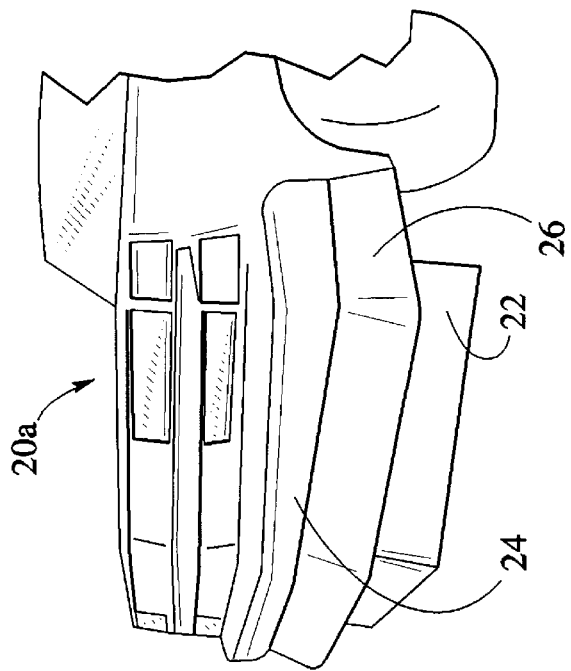
FIG. 1 is a perspective view of a first embodiment of the aerodynamic or moldboard structure affixed to the front end of a pickup truck.

FIGS. 1 and 2 depict the front portions of the vehicles 20*a* and 20*b*, a pickup truck 20*a* and a tractor/trailer truck 20*b*, respectively. The present invention is also useful with other types of vehicles, such as passenger cars, trailers, buses, motorhomes, and railroad cars and carriages. A movable moldboard 22 extends downwardly from an adjacent front bumper 24 of each vehicle 20. A stationary air deflector 26 independent or connected to the front bumper 24 of each vehicle, is slightly forward of the moldboard 22. The stationary air deflector 26 overlaps an upper end of the moldboard 22. The stationary air deflector 26 may be made integral with the front bumper 24 of the vehicle 20, for ease of manufacturing and to give an integrated appearance to the front end of the vehicle. FIGS. 1–2 illustrate the moldboard 22 as positioned near the front end 24 of the vehicle 20. The moldboard 22 may also be positioned at a longitudinally intermediate position along the frame as discussed below.

FIGS. 3–5 schematically illustrate the positioning of the moldboard 22 and the stationary air deflector 26 for the embodiment wherein the moldboard is positioned near the front bumper 24 of the vehicle. FIGS. 10–13 schematically illustrate the positioning of the moldboard and the stationary air deflector 26 for the embodiment wherein the moldboard is positioned at an longitudinally intermediate location on the vehicle. The same reference numerals and description are used for both embodiments, where appropriate.

As shown in FIGS. 3–5, the pertinent portion of the basic structure of a vehicle 20 will first be described. The vehicle has a body with a frame 32. The details of the structure of the body and the frame are omitted for clarity. The frame 32 includes a longitudinal centerline axis 34 and a transverse axis 36 perpendicular to the longitudinal axis 34. The frame has a front end 38 and a back end 40. A forward axle 42 is affixed to the frame 32 near the front end 38, and extends parallel to the transverse axis 36. A front tire 44 is positioned at each end of the forward axle 42. A rear axle 46 is affixed to the frame 32 at a location rearwardly of the forward axle 42 and extends parallel to the transverse axis 36. The rear axle 46 may be located near the back end 40, or it may be positioned at an intermediate location. For example, there may be several axles and sets of wheels on a large truck. The forward axle 42 is the forward-most of the axles, and the rear axle 46 may be any of the other axles. A rear tire 48 is positioned at each end of the rear axle 46. The front tires 44 and the rear tires 48 rest on a ground surface 50.

A moldboard structure 52 has a central point 54 and a moldboard 22 extending laterally from the central point, with a lower edge 58 and an upper edge 60. The moldboard 22 preferably is a flat or contoured thin piece of a material extending downwardly from the region of the frame 32 toward the ground surface 50. The moldboard 22 extends downwardly essentially vertically, as shown in FIGS. 4 and 5, when the moldboard 22 is in both its raised and in its lowered position. The moldboard 22 is preferably made of a plastic material such as polypropylene, which is sufficiently rigid to withstand aerodynamic forces but sufficiently flexible to bend when an object is contacted and to withstand routine types of impacts such as by stones or other roadway debris.

Figure 6:
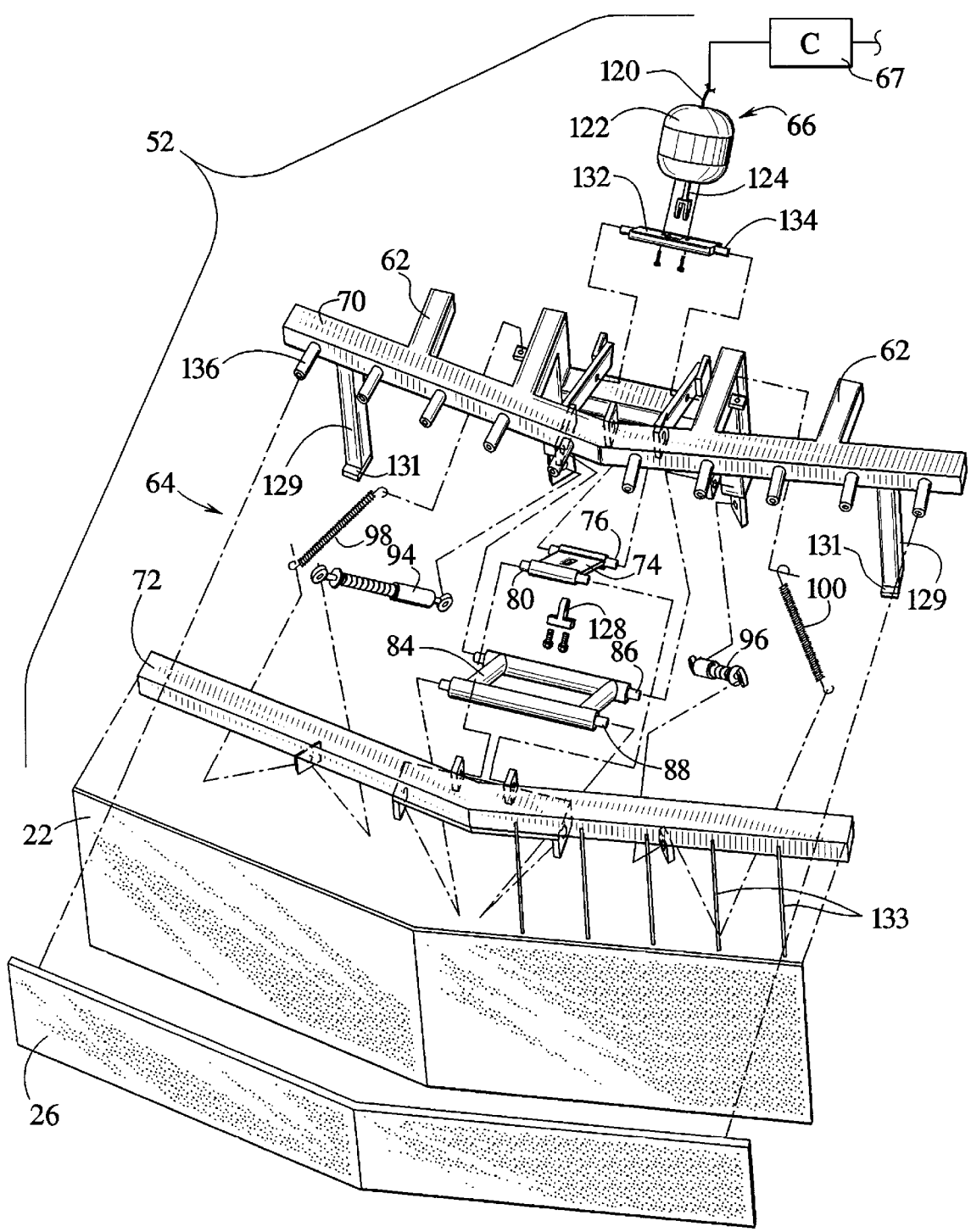
FIG. 6 is an exploded perspective view of the structure of FIG. 3A.
Figure 7:
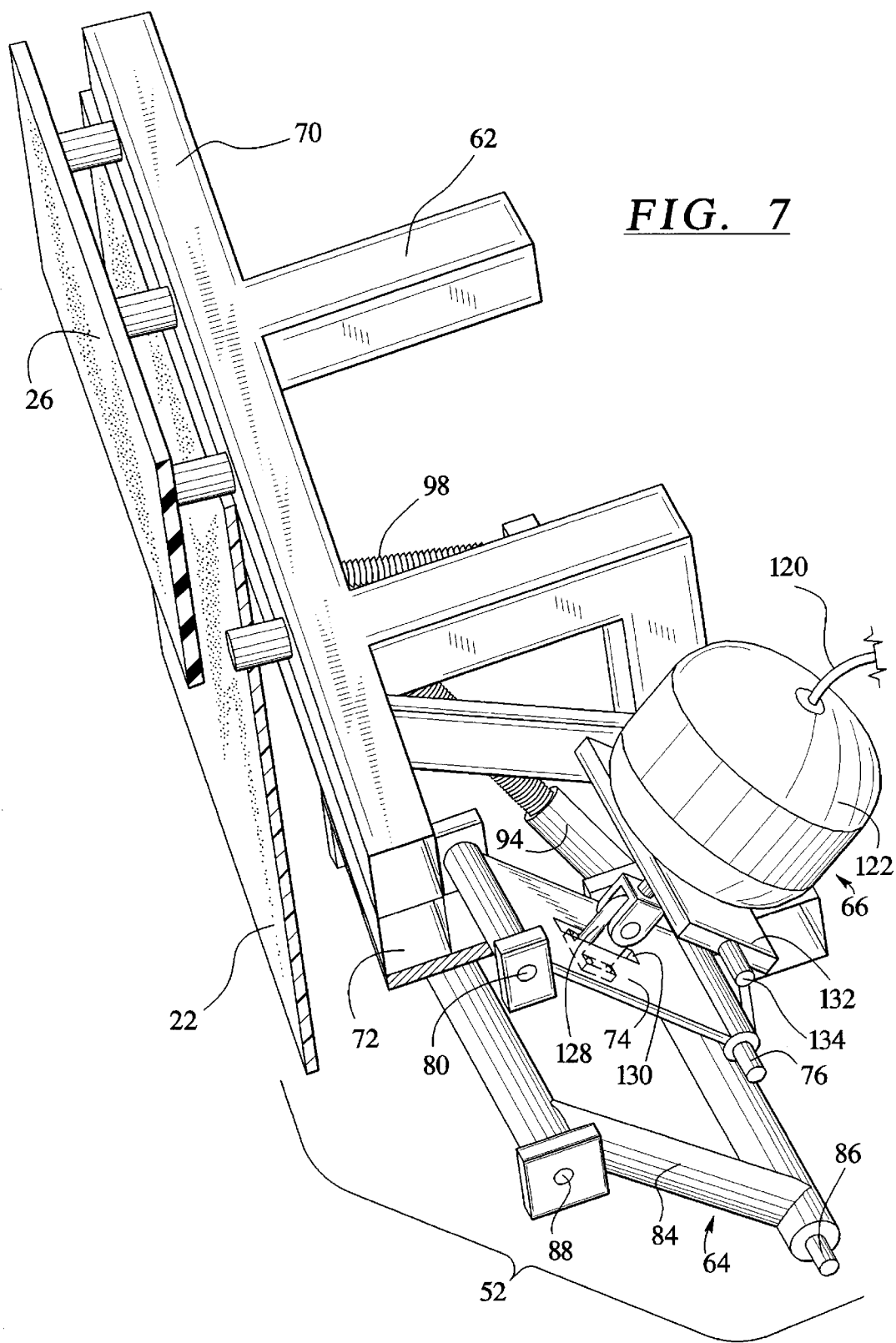
FIG. 7 is a cut away perspective view of the structure of FIG. 3A in a raised position.
Figure 8:
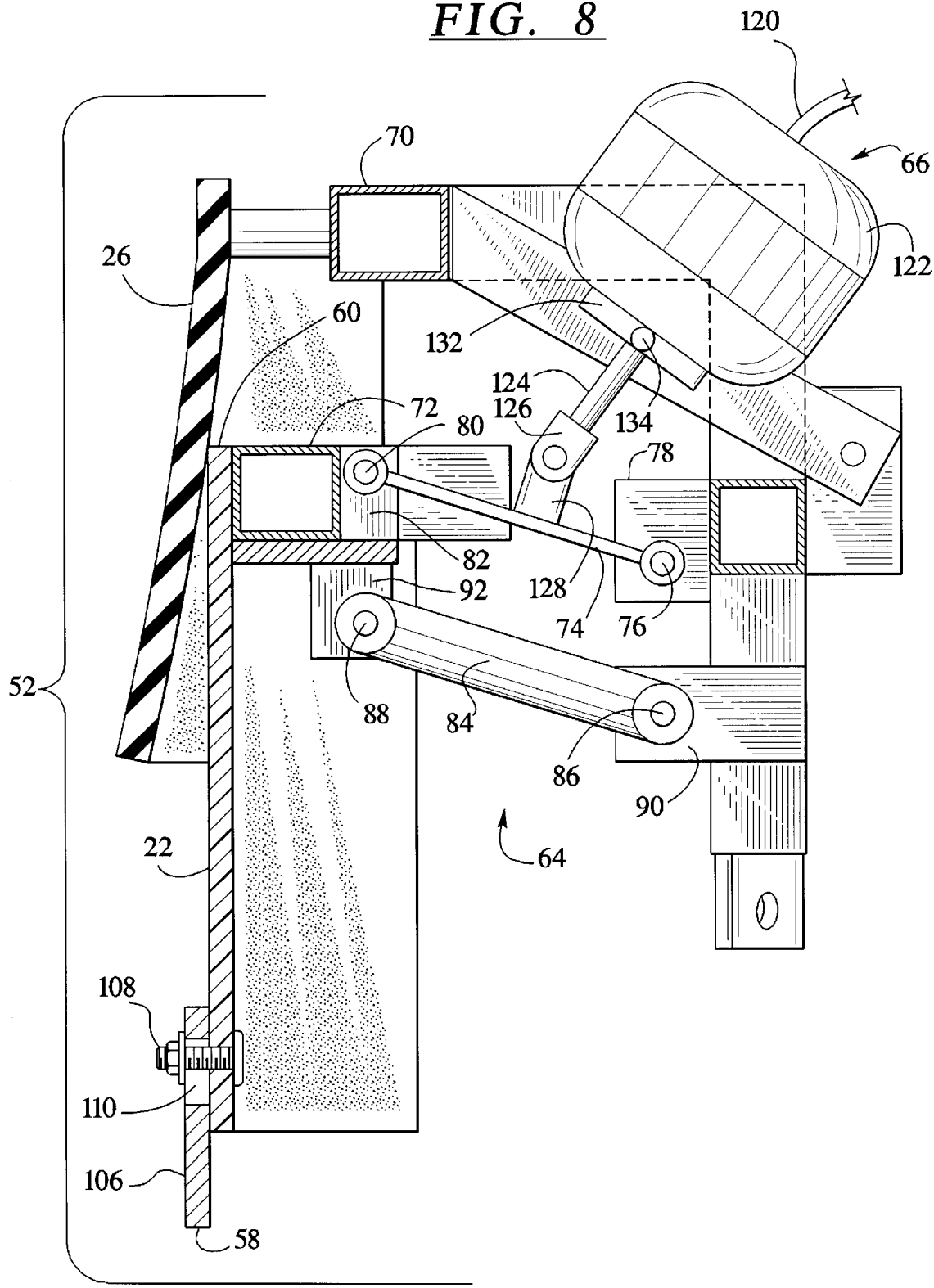
FIG. 8 is a side sectional view of the structure of FIG. 3A in a partially lowered position.
Figure 9:
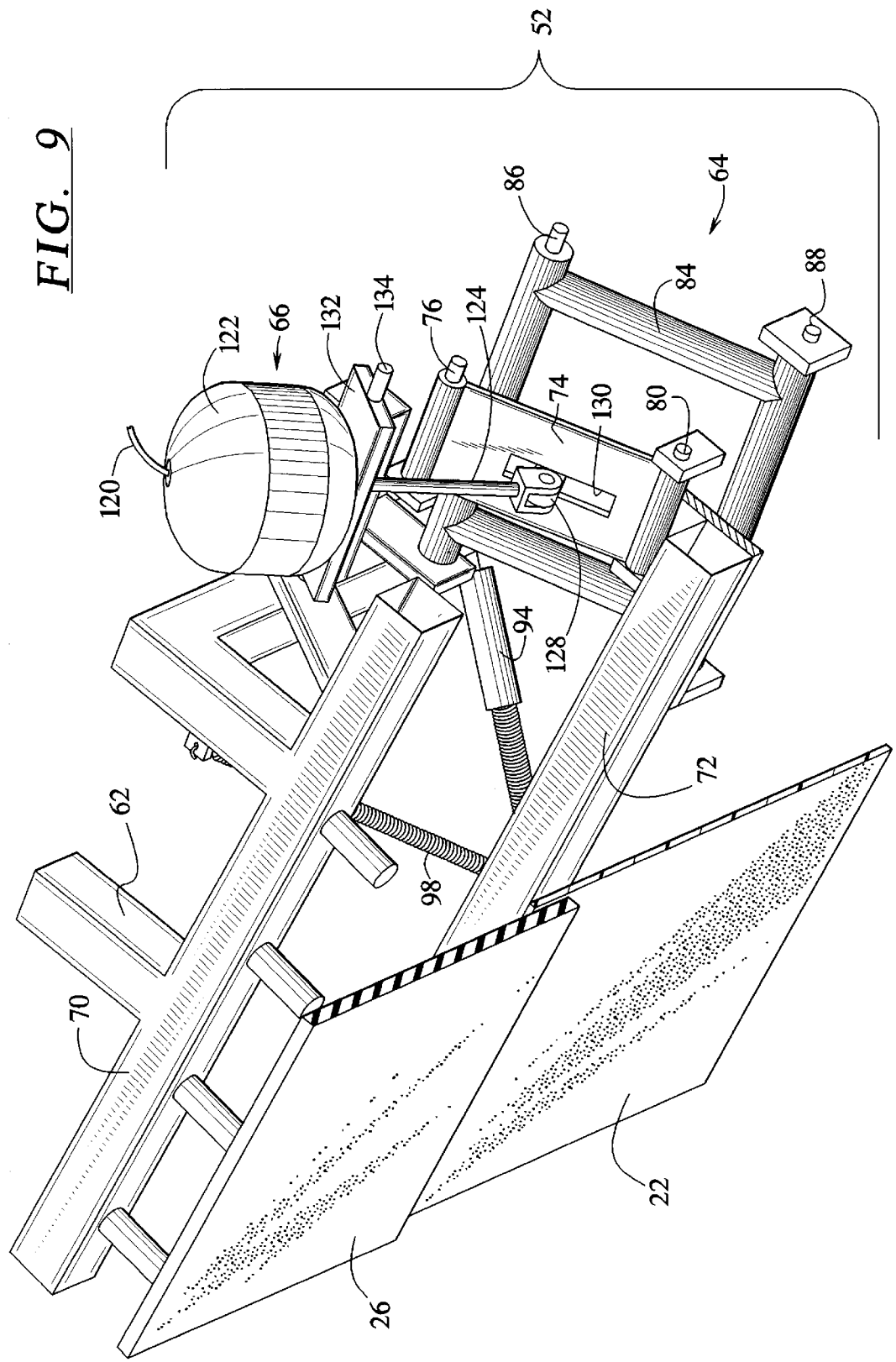
FIG. 9 is a partial top perspective view of the structure of FIG. 3A in a lowered position.
Figure 10:
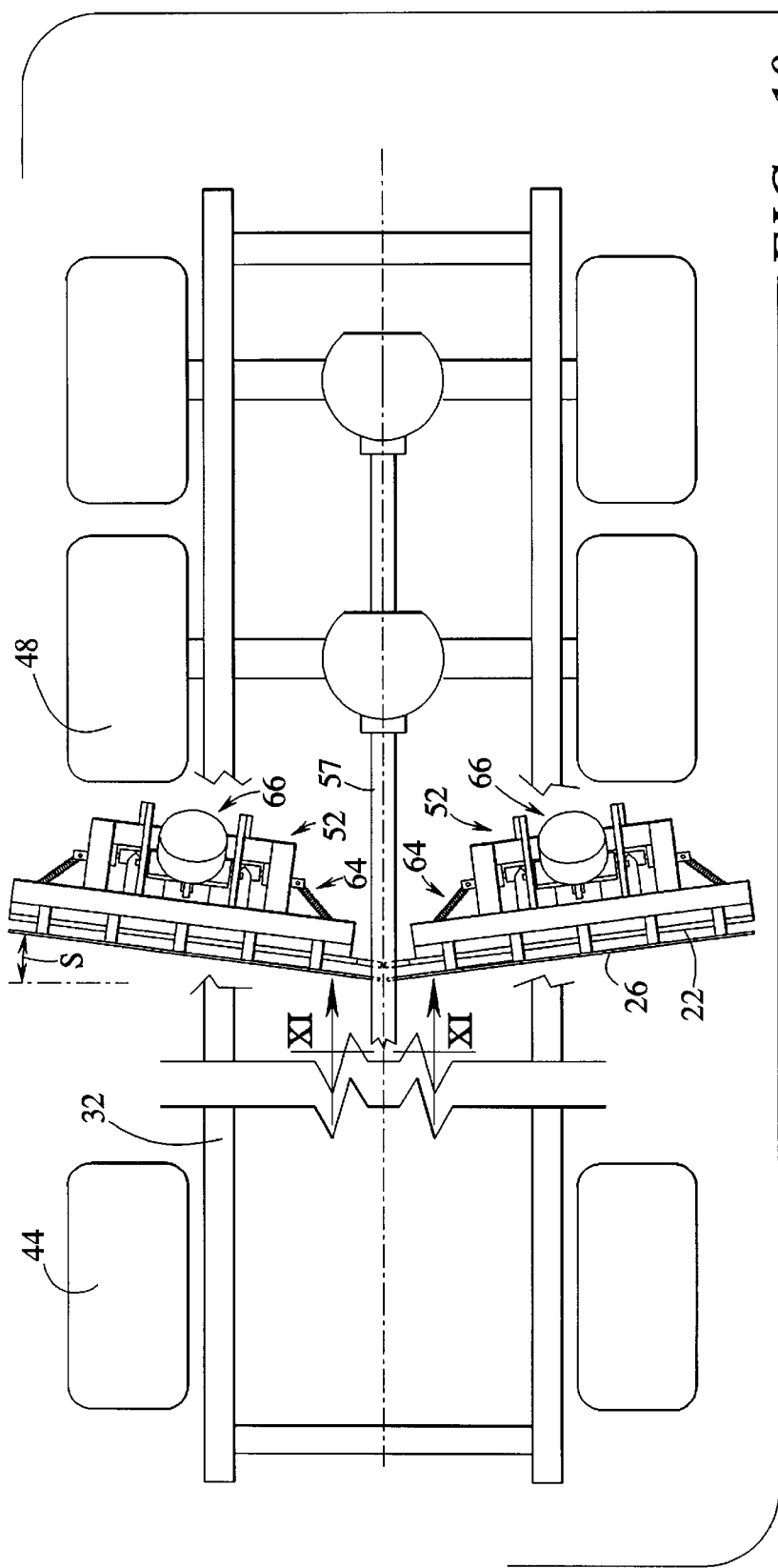
FIG. 10 is a schematic plan view of the vehicle frame with the structure affixed to a midframe location.
Figure 11:
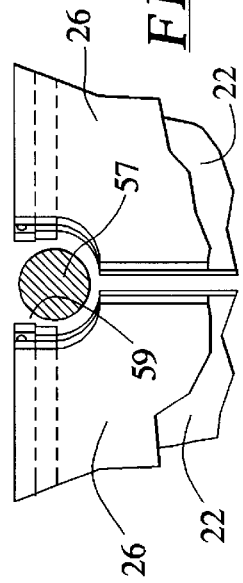
FIG. 11 is a partial front view taken along the line XI—XI on FIG. 10.

The moldboard 22 extends laterally outwardly on each side of the longitudinal centerline axis 34. In FIGS. 3–5, the moldboard structure 52 is positioned immediately forward of the forward axle 42, and in FIGS. 10–13, the moldboard structure 52 is positioned immediately forward of the rear axle 46. The axle immediately behind the moldboard structure 52, the forward axle 42 in FIGS. 3–5 and the rear axle 46 in FIGS. 6–8, is termed the "adjacent axle". The moldboard 22 may be continuous at the central point 54, as illustrated in FIGS. 3–5. The moldboard 22 may be separated and not joined at the central point 54, as illustrated in FIGS. 10–13. The latter embodiment is preferred when the moldboard 22 is at an intermediate longitudinal location along the frame, as illustrated in FIGS. 10–13. This configuration provides a central gap 59 so that the drive shaft 57 of the vehicle may pass through the moldboard 22 (FIG. 11).

The moldboard 22 extends outwardly and rearwardly from the central point 54 at a sweepback angle S (FIG. 3A), measured between the transverse axis 36 and the moldboard 22. The angle S is from about 10° to about 25°. If S is less than about 10°, the moldboard 22 will be too flat and it will restrict air flow, causing the airflow to not be smooth. If S is greater than about 25°, this results in poor control of air and uneven pressure on the moldboard. Preferably, the sweepback angle S is in a range of 15° to 19° and most preferably the angle is about 17°.

The moldboard 22 shown in FIG. 3A is a preferred shape, wherein the central point 54 is the furthestmost forward point on the moldboard and the two side extensions angle away from the central point at the angle S. In some vehicle configurations, however, due to the geometry of the bumpers and other vehicle parts, the shape of the moldboard will vary. For example, in FIG. 3B (and FIG. 2) a moldboard 22B is illustrated as having a central flat section 22.1 and two laterally offset angled portions 22.2. These angled portions should be positioned at the angle S as described above. In FIG. 3C, a moldboard 22C has a continuously curving shape in the form of an arc. Again, the rearward curvature of the moldboard 22C should result in the angle S as described above. Other than the shape, as viewed from above, the moldboard 22B and 22C are identical to the moldboard 22 shown and described in FIGS. 3A and 4–9 and the remainder of the description of the moldboard applies to any of the shapes described.

The moldboard 22 extends transversely to a position at least as wide as a centerline 61 of the adjacent tire to a position 63 no greater than about 6" beyond the outside edge of any part of the vehicle structure. On some vehicles, the tires define the outside edge of the vehicle. On other vehicles, other parts, including bumpers, fenders, etc. extend further laterally than the tires. Preferably the moldboard 22 will terminate beyond the tire of the adjacent axle by a distance of about 2". In this manner, air and water will be prevented from striking the tire, which in turn causes side spray and additional turbulence. For many vehicles, the moldboard 22 will extend to the side of the vehicle further than any other part of the structure, and therefore it is preferred that the extension be no greater than necessary, and most preferably not greater than about 6".

A support 62 affixes the moldboard structure 52 to the frame 32 by appropriate fastening devices such as bolts, brackets, clamps, etc. The support 62 can be in the form of a bracket which attaches to the vehicle frame 32, and in some mounting arrangements, the support may interface with mounting provisions, such as tow bar recesses 65 (FIG. 2) which are provided on some vehicles. The moldboard structure includes a mechanical linkage 64 operable to move the moldboard 22 between a lowered position (as shown in FIGS. 5 and 13) wherein the lower edge 58 of the moldboard 22 is at a lowered distance $D_1$ of from about 1 to about 3" from the ground surface 50, and a raised position (as shown in FIGS. 4 and 12) wherein the lower edge 58 of the moldboard 22 is at a raised distance $D_2$. If $D_1$ is less than about 1", ground contact from uneven roads will occur. If $D_1$ is greater than about 3", too much air can pass under, thus diminishing the effect of the moldboard. The value of $D_2$ is typically from about 10" to about 12", allowing the moldboard 22 to be raised to a sufficient height above the ground that it passes over most obstacles that might be found on the ground surface 50. The difference $(D_2-D_1)$ is typically from about 7" to about 11".

A drive 66 is operable to controllably move the moldboard 22 between the lowered position and the raised position. The drive 66 may be of any compatible type, such as pneumatic, hydraulic, or electric drive. An apparatus control 67 (FIG. 6) is provided for the drive 66. This control could be operated manually by the driver from the driver's seat, such as by depressing a lever or a button, or the control could operate automatically to position the moldboard a particular distance from the ground based on various input factors, such as temperature and vehicle speed. The position of the moldboard could be determined by various measuring devices such as infra-red detectors, sonic sensors, etc. Alternatively, the lower position of the moldboard could be preset and the moldboard could lower to a bottom most position each time it is used. A specific arrangement is described below.

The stationary air deflector 26 is optionally present. The embodiments are shown with a stationary air deflector 26, although any of the embodiments may be used with or without a stationary air deflector. The stationary air deflector 26 is generally conformably shaped with the moldboard 22. The stationary air deflector 26 overlaps the upper edge 60 of the moldboard 22 when the moldboard is in the lower position. The function of the stationary air deflector 26 is to fill the void created when the movable moldboard is extended downward. The stationary air deflector 26 also seals against the lower moldboard while the vehicle is moving, by means of air pressure, to provide a smooth continuous flow of air at the front of the moldboard structure 52.

FIGS. 6–9 illustrate embodiments of the moldboard structure 52 comprising the support 62, mechanical linkage 64 and drive 66 in greater detail. This arrangement may be used with either of the embodiments of FIGS. 3–5 or 10–13, but is illustrated for the embodiment of FIGS. 3–5.

The moldboard structure 52 includes a stationary mounting bar 70 which is to be affixed to the support 62 which is to be affixed to the frame 32 of the vehicle by suitable mounting means, such as by bolts or brackets. The moldboard structure 52 also includes a movable mounting bar 72 to which the moldboard 22 is attached by suitable mounting means, such as bolts. The mounting bars 70 and 72 are desirably angled rearwardly from their longitudinal centers by the sweepback angle S to form rearwardly facing shallow Vs. The mounting bars 70 and 72 extend horizontally and, therefore, lie parallel to the lower edge 58 and upper edge 60 of the moldboard 22.

The mechanical linkage 64 extends between the stationary mounting bar 70 and the movable mounting bar 72. The mechanical linkage 64 includes a number of components including a hinge plate 74 pivotally connected at one end 76 to a bracket 78 secured to the stationary mounting bar 70 by means of a pin and bore arrangement. The hinge plate 74 is pivotally connected at a second end 80 to a bracket 82 attached to the movable mounting bar 72, again by a pin and bore arrangement. A pivot frame 84 is provided which is pivotally attached at one end 86 in vertical alignment with and at a specified distance from the first pivoting end 76 of the hinge plate 74. The pivot frame 84 has a second end 88 which is positioned in vertical alignment with and at the same specified distance from the second end 80 of the hinge plate 74. The first end 86 of the pivot frame 84 is secured to a bracket 90 which attaches to the stationary mounting bar 70 and the second end 88 of the pivot frame 84 attaches to a bracket 92 secured to the movable frame 72. Thus, as the movable frame 72 moves, the hinge plate 74 and pivot frame 84 move simultaneously in parallelogram fashion. The pivot frame 84 provides additional lateral stability to the motion of the pivot plate 74 to prevent twisting of the movable mounting bar 72 about a vertical axis or around the longitudinal axis 34. Stabilizing struts 94, 96 further assist in preventing twisting of the movable mounting bar 72 and the moldboard 22 attached thereto. Tension springs 98, 100 extend between brackets attached to the stationary mounting bar 70 and the movable mounting bar 72 to normally hold the movable mounting bar 72 up against the bottom of the stationary mounting bar 70 as shown in FIGS. 4 and 7, wherein the moldboard 22 is held in the raised position.

It should be pointed out that although the moldboard 22 is illustrated as having a greater vertical height than the stationary air deflector 26, such that it protrudes below the stationary air deflector 26, even in the raised position. While it is not necessary for the moldboard to have a greater height than the stationary air deflector, there is a relationship between the two heights and other considerations that come into play. That is, the stationary air deflector 26 has to have a sufficient height such that when the moldboard 22 is moved down to its lowermost position, the bottom of the stationary air deflector 26 should still cover the top end 60 of the moldboard. This will assure that there is no gap between the stationary air deflector 26 and the moldboard 22. The moldboard 22 has to have a height sufficient so that when it is moved to its full downward position it will have its lower end 58 at the distance $D_1$ described above, namely, between 1 and 3" from the road surface 50. Depending, on the location of the vehicle frame 32 and the precise mounting arrangements of the stationary and movable mounting bars, and the amount of travel provided by the drive 66, the height of the moldboard 22 will vary.

In some situations the moldboard 22 will be completely hidden by the stationary air deflector 26 when the moldboard 22 is in its raised position. In other instances the moldboard 22 will still project below the stationary air deflector 26 when the moldboard is in the raised position. In those instances, it may be desirable to add decorative features to the exposed portion of the moldboard, including chrome elements, lights, company insignia or other features.

The moldboard 22 may also be provided with a vertically adjustable extension piece 106 as illustrated in FIG. 8 which can attach by means of a bolt 108 and slot 110 arrangement so that the lower edge 58 can be vertically adjustable to accommodate different mounting arrangements and also to accommodate different driving conditions. For example, it has been found that performance is enhanced in a hot dry atmosphere, such as encountered in desert driving, by having the moldboard 22 extend much closer to the road, that is, nearer to the 1" dimension. In more humid or wet conditions, it has been found that the lower edge should be raised slightly, more toward the 3" position. By having the adjustable extension 106, the height of the moldboard above the road surface can be adjusted by the driver as conditions warrant.

The drive 66 is illustrated in FIGS. 6–9 as comprising a pneumatic diaphragm device which is supplied from a source of pressurized air by means of conduit 120 which can be regulated by the driver or by some other control such as control 67. The pressurized air is let into a container 122 which contains a diaphragm therein. The diaphragm is connected to a rod 124 which extends out of the container and is pivotally connected at a bracket 126 to another bracket 128 provided on the pivot plate 74. The bracket 128 on the pivot plate 74 can be carried in a slot 130 and secured in a fixed position within that slot to provide a certain amount of swing, and thus vertical displacement, for the second end 80 of the plate 74. If a greater vertical displacement is required for the moldboard 22, between the raised position and the lower position, the bracket 128 should be moved toward the first end 76 of the hinge plate 74. If less vertical travel is required for the moldboard 22, then the bracket 128 should be moved toward the second end 80 of the hinge plate 74.

The container 122 is carried on a plate 132 which is free to pivot on pins 134 to prevent any binding as the rod 124 moves in and out of the container 122. When the moldboard 22 is in the raised position, air pressure in the container 122 will be relieved and springs 98, 100 will hold the movable mounting bar 72 up against the stationary mounting bar 70 and the rod 124 will be fully retracted within the container 122. When the moldboard 22 is to be lowered, pressurized air is supplied through conduit 120 to the container 122 thus urging the rod 124 outward, as shown progressively in FIGS. 8 and 9, moving the movable mounting bar 72 downward against the bias of the springs 98, 100. When the rod 24 is in the full extended position (FIGS. 5 and 9) the moldboard 22 will be extended to its full downward position.

As the moldboard 22 moves from the raised position (FIGS. 4 and 7) to the lowered position (FIGS. 5 and 9) it will remain essentially vertical, due to the parallelogram nature of the hinge plate 74 and pivot frame 84, but it will move slightly forwardly in an arc midway through its travel, as shown in FIG. 8. At this point, the moldboard could press against the backside of the stationary air deflector 26, but since the stationary air deflector 26 preferably is somewhat flexible, it will move forward to accommodate the movement of the moldboard. When the moldboard reaches the full lower position, the stationary air deflector 26 will be positioned forwardly of the moldboard 22, but when the vehicle is moving at any significant speed, the air pressure on the front of the stationary air deflector 26 will press it back against the moldboard 22, thus providing a relatively smooth continuous surface between the two parts.

When the moldboard 22 is to be moved to the raised position, the air pressure in the container 122 is released, permitting the springs 98, 100 to return the movable frame 72 to the raised position as shown in FIGS. 4 and 7.

Additional features can be added, such as a back support and vertical limit bracket 129 permanently attached to stationary frame 70 and extending downwardly such that when the movable mounting bar 72 reaches its lowermost position, it will rest vertically and horizontally on a horizontal plate 131 formed at the bottom of the limit bracket.

Thus the moldboard 22 would be vertically supported by the bracket, and it will also be supported in a horizontal manner so that it will retain a vertical orientation, even under a heavy air pressure load caused by the vehicle moving at a high speed. Also, spring rods 133 can be mounted between the moldboard 22 and the movable support bar 72, which extend downwardly along the height of the moldboard which will serve to assure that the moldboard 22 maintains essentially a vertical orientation, yet which will provide flexibility for rearward deflection if the moldboard strikes an obstacle, and then provide for a return of the moldboard to the vertical position once the obstacle has passed. Such optional spring rods, for example, may be formed of spring steel.

The stationary air deflector 26 is shown as being attached to the stationary frame 70 by means of spacers 136. Alternatively, the frame size of the stationary frame 70 can be adjusted so that the stationary air deflector 26 is attached directly to the frame 70 in a position that is in front of the movable moldboard 22.

Other specific details and constructions as detailed in the preferred embodiment can be modified as well. For example, the stationary air deflector 26 may be formed as a part of the vehicle and not attached at all to the frame 70. In some vehicles, the front bumper or some other part of the vehicle may serve as the stationary air deflector.

The mechanical linkage which provides movement of the moldboard from the raised position to the lowered position can be modified in any number of different ways. What is significant is that the moldboard must be placed into a position wherein the bottom edge of the moldboard is within about 1 to 3" of the road surface when in the lowered position and, when in the raised position, is sufficiently clear of the road to avoid obstacles. Typically the raised position would be at least 8" and preferably approximately about 10 to 12" above the ground surface. It is most preferred that the moldboard 22, when in the lowered position, assume a generally vertical orientation, although it could be angled relative to vertical by some relatively small angle, such as up to about 10° on either side of vertical.

The mechanical linkage illustrated provides that the moldboard 22 moves essentially vertically between the raised and lowered positions which, in most vehicles, may be necessary due to space considerations. However, in other vehicles it may be possible to use a mechanical linkage wherein the moldboard pivots between the raised position and the lowered position such that in the raised position the moldboard would not be in an essentially vertical orientation. Also, although the arrangement illustrated utilizes a pneumatic device for moving the hinge plate 74, it will be readily understood that hydraulic or electric drive mechanisms could be used as well. Further, other linkages could be provided, including direct (not hinged) drive of the moldboard to move it between the raised and lowered position. Various types of drive mechanisms, including screw drives, rack and pinion drives, mesh gears, manual levers or slides and other drive arrangements could be utilized.

The particular mounting arrangement illustrated also contemplates using separate frame elements for the moldboard and stationary air deflectors. Although such an arrangement is preferable from a manufacturing view point in accordance with the preferred embodiment illustrated, it would be possible to construct the moldboard 22 and movable frame 72 as a unitary, as well as the stationary air deflector 26 and the stationary support arm 70 as a unitary element.

Further, the drive mechanism illustrated provides for a driving force to be selectively applied to move the moldboard from the raised position to the lowered position and the drive mechanism provides for an automatic return to the raised position by means of the springs 98, 100. This provides for automatic lifting of the moldboard 22 to the raised position in the event that there is a loss of air pressure supplied to container 122, for safety considerations and for avoidance of obstacles by the moldboard 22. Alternatively, the drive arrangement could require a positive driving force under the control of the driver or some other control.

The moldboard 22 is preferably formed from a sheet of plastic material, such as polypropylene, which, in a ¼ thickness, has been found to be sufficiently rigid so as to maintain its shape under the air pressures and air flows associated with highway speeds, and also tough enough to withstand impacts of road debris. Other materials could be substituted, including metal, rubber and other plastics, so long as the rigidity, flexibility and durability characteristics are maintained. Also, the preferred embodiment illustrates the moldboard 22 as a single sheet (or side by side single sheet segments), however, the moldboard could be constructed as a multiple sheet, a foldable or bendable sheet, or multiple sheet segments that could be moved vertically, horizontally or pivotally between the raised and lowered positions.

In FIGS. 10–13 there is illustrated an alternative placement for the moldboard structure 52 wherein the moldboard structure is not placed in front of the front tires 44, but rather is placed in front of a rear tire 48 which, as illustrated, may be an intermediate tire, such as the drive tire in a semi-trailer tractor.

In most respects, the arrangement as described previously is also present in the moldboard structure 52 in the intermediate placement, however, some differences are present. For example, the moldboard 22 as well as the stationary air deflector 26 may be split at the central location to allow passage of the drive shaft 57. This placement also requires that two separate drive mechanisms 66 and two separate supports 62 and two separate mechanical linkages 64 be used. However, each of these supports, linkages and drives can be substantially identical to those as described above, including the various alternatives. It is possible, with the smaller width of each moldboard segment, that the stabilizing struts 94, 96 would not be necessary in this alternative location. Also, it is possible to drive both drive mechanisms 66 simultaneously so that the movement of the moldboard segments will occur simultaneously. This would permit a single unitary moldboard to be used in this location as well, with the possible requirement of providing the clearance gap 59 at the top center of the moldboard 22 and stationary or deflector 26 as shown in FIG. 11. In all other respects, including the size of the sweepback angle S and the lateral extent of the moldboard, at least to the centerline of the adjacent tire 48 and preferably no greater than 6" beyond the outside edge of the tire, are the same. Again, other particular arrangements for the drive, for the mechanical linkage and for the specifics of the attachment of the moldboard and stationary air deflectors, and movement of the moldboard between the raised and lower position can be modified as discussed above. However, it continues to be important that, in the lowered position, the bottom edge 58 of the moldboard be positioned within about 1 to 3" of the ground surface 50.

The present invention has been reduced to practice and experimentally operated on two different types of vehicles. In one reduction of practice, a pickup truck was provided with a front-mounted moldboard structure as in FIGS. 1 and 3–5. The gas mileage of the truck was measured both with and without the moldboard structure present, in each case averaging results over driving distances of 10,000 miles. The fuel gas mileage with the moldboard structure present and functioning was 20% greater than that without the moldboard structure present. In another reduction to practice, a tractor/trailer truck of the type shown in FIG. 2 was provided with a front mounted moldboard structure. The gas mileage of the truck was measured both with and without the moldboard structure present, in each case averaging results over driving distances of 500,000 miles. The fuel gas mileage with the moldboard structure present and functioning was 14% greater than that without the moldboard structure present. Additionally, the tractor/trailer truck was tested in wet conditions both with and without the moldboard structure present and the results were documented by filming the truck with a camera in a following vehicle. When no moldboard structure was present, the truck produced extensive, heavy side spray even with mud flaps present. With a moldboard structure present and functioning, the side spray from the truck was reduced substantially, by about 60%, thereby greatly improving the visibility for vehicles meeting, beside, or following the equipped vehicle.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. An aerodynamic structure for use with a vehicle having:
    a body including:
        a frame having a longitudinal centerline axis and a transverse axis perpendicular to said longitudinal axis, and further having a front end and a back end,
        a forward axle affixed to the frame parallel to said transverse axis with a front tire at each end of said front axle and rear axle affixed to the frame rearwardly of said front axle and parallel to said transverse axis with a rear tire at each end of said rear axle, said front and rear tires resting on a ground surface,
    said aerodynamic structure comprising:
        a moldboard structure having a central point arranged in line with said centerline axis and a moldboard with a lower edge, extending laterally outwardly on each side of said longitudinal centerline axis, said moldboard being located forward of an adjacent axle, said moldboard extending outwardly and rearwardly from said central point at a sweepback angle of from about 10° to about 25° to the transverse axis, said moldboard extending transversely beyond a centerline of said tire of the adjacent axle by a distance of about 0" to about 6"; and
        a support affixing said moldboard structure to said frame, said support including:
            a mechanical linkage operable to move said moldboard between a lowered position wherein said lower edge of the moldboard is at a lowered distance of from about 1 to about 3" from said ground surface, and a raised position wherein said lower edge of said moldboard is at a raised distance from said ground surface that is greater than said lowered distance, and
            a drive operable to controllably move said moldboard between said raised position and said lowered position, and
            a control operable by a driver of said vehicle to control said drive,
    wherein said support is affixed to an intermediate location between said front end of said frame and said back end of said frame, such that said moldboard lies rearward of said forward axle and forward of said rear axle, and wherein said adjacent axle is said rear axle.

2. The aerodynamic structure of claim 1, wherein said moldboard is separated at said central point into a right extension and a left extension.

3. The aerodynamic structure of claim 1, wherein said support comprises:
    a stationary mounting bar affixed to said frame, with a stationary air deflector, and
    a movable mounting bar to which said moldboard is affixed,
    said mechanical linkage extending between said stationary mounting bar and said movable mounting bar, and
    said drive extending between said stationary mounting bar and the movable mounting bar.

4. The aerodynamic structure of claim 1, further including:
    a stationary air deflector affixed to said frame at a location immediately forward of said moldboard, such that, when said moldboard is in said lower position, a lower edge of said stationary air deflector overlaps an upper edge of said moldboard.

5. The aerodynamic structure of claim 1, wherein said distance between said lower edge of said moldboard in said lowered position and said lower edge of the moldboard in said raised position is from about 7" to about 11".

6. An aerodynamic structure to be used on a vehicle, wherein said vehicle has a longitudinal centerline axis, a lateral axis perpendicular to said longitudinal axis, an axle positioned parallel to said lateral axis and carrying a wheel for engaging a road surface at each end thereof, and a front end, said structure comprising:
    a vertically movable, substantially vertical air deflector member positioned in front of said axle and extending laterally at least to a centerline of said wheels;
    a mounting structure comprising upper and lower fixed pivots secured to said vehicle, upper and lower pivots secured to said deflector member, with a fist arm extending between said upper fixed pivot and said upper deflector pivot and a second arm extending between said lower fixed pivot and said lower deflector pivot,
    said deflector member movable between a raised position and a lowered position by means of said arms and pivots such that said deflector maintains a substantially vertical orientation while moving between said raised position and said lowered position, wherein said deflector member in said lowered position has its lowest most extent positioned above and not in contact with said road surface; and
    a drive mechanism connected to said deflector member to move said deflector member between said raised position and said lowered position.

7. An aerodynamic structure according to claim 6, wherein said air deflector comprises a board-like member having a forward point and arms which extend laterally and rearwardly at an angle from about 10 degrees to 25 degrees from said lateral axis.

8. An aerodynamic structure according to claim 6, wherein said air deflector comprises a board-like member having a middle section parallel to said lateral axis and arms which extend laterally and rearwardly at at angle from about 10 degrees to 25 degrees from said lateral axis.

9. An aerodynamic structure according to claim 6, wherein said air deflector comprises a board-like structure which is curved in a continuous lateral arc with a central point at a forwardmost position.

10. An aerodynamic structure according to claim 6, wherein said drive mechanism is arranged to move said deflector member to said lowered position wherein a lower edge of said deflector member is positioned no more than one to three inches above said road surface.

11. An aerodynamic structure according to claim 6, wherein said drive mechanism is arranged to move said deflector member to said raised position wherein no part of said deflector member is position less than 8 inches above said road surface.

12. An aerodynamic structure according to claim 6, wherein said structure further comprises a second, non-movable air deflector member positioned in front of and above, but in an overlapping relationship with, said movable air deflector member.

13. An aerodynamic structure according to claim 6, wherein said drive mechanism is one of a pneumatic drive, a hydraulic drive and an electric drive.

14. An aerodynamic structure according to claim 6, wherein said air deflector mechanism extends laterally to no more than 6 inches beyond said vehicle structure.

15. An aerodynamic structure according to claim 6, wherein said structure is positioned at said front of said vehicle, in front of a front axle thereof.

16. An aerodynamic structure according to claim 6, wherein said structure is positioned at an intermediate position on said vehicle, behind a front axle thereof.

17. An aerodynamic structure to be used on a vehicle, wherein said vehicle has a longitudinal centerline axis, a lateral axis perpendicular to said longitudinal axis, an axle positioned parallel to said lateral axis and carrying a wheel for engagement with a road surface at each end thereof and a front end, said structure comprising:
- a vertically movable substantially vertical air deflector member positioned in front of said axle and extending laterally at least to a centerline of said wheels and no more than about 6 inches beyond an outside of said wheel;
    - said air deflector comprising a board-like member having portions extending laterally and rearwardly at an angle from about 10 degrees to 25 degrees from said lateral axis,
- a mounting structure comprising upper and lower fixed pivots secured to said vehicle, upper and lower pivots secured to said deflector member, with a first arm extending between said upper fixed pivot and said upper deflector pivot and a second arm extending between said lower fixed pivot and said lower deflector pivot,
- said deflector member movable between a raised position wherein no portion of said movable deflector is less than 8 inches from said road surface and a lowered position wherein a lower edge of said deflector is between about 1 and 3 inches from said road surface; by means of said arms and pivots such that said deflector maintains a substantially vertical orientation while moving between said raised position and said lowered position,
- a drive mechanism connected to said deflector member to move said deflector member between said raised position and said lowered position, and
- a control operable by a driver of said vehicle to operate said drive.

18. An aerodynamic structure according to claim 6, wherein said air deflector comprises a vertically adjustable extension piece is secured to a lower edge of a moldboard to permit a height of said deflector to be adjusted relative to said road surface.

19. An aerodynamic structure to be used on a vehicle, wherein said vehicle has a longitudinal centerline axis, a lateral axis perpendicular to said longitudinal axis, an axle positioned parallel to said lateral axis and carrying a wheel for engagement with a road surface at each end thereof and a front end, said structure comprising:
- a vertically movable substantially vertical air deflector member extending laterally at least to a centerline of said wheels and no more than about 6 inches beyond an outside of said wheels;
    - said air deflector comprising a rigid movable mounting bar member extending laterally and rearwardly at an angle from about 10 degrees to 25 degrees from said lateral axis and a thin substantially rigid, yet yieldable plastic board-like member secured to said mounting bar member in a substantially vertical orientation and conforming to said angle of said mounting bar member,
- a mounting structure comprising a stationary mounting bar member for attachment to the vehicle and upper and lower fixed pivots secured relative to said stationary mounting bar member, upper and lower deflector pivots secured to said movable mounting bar member, a first arm extending between said upper fixed pivot and said upper deflector pivot and a second arm extending between said lower fixed pivot and said lower deflector pivot,
- said deflector member movable between a raised position and a lowered position by means of said first arm, second arm and pivots such that said deflector maintains a substantially vertical orientation while moving between said raised position and said lowered position and such that the movement between the two positions is at least 5 inches,
- a drive device secured relative to said stationary mounting bar member,
- a drive mechanism including an extendable and retractable rod moved by said drive device, said rod connected by means of one of said arms to said deflector member to move said deflector member between said raised position and said lowered position as said rod retracts and extends, and
- a control operable by a driver of said vehicle to control said drive device.

20. An aerodynamic structure according to claim 19, wherein said drive device is connected to said one of said arms in an adjustable manner to adjust an amount of vertical movement said drive mechanism transmits to said deflector.

21. An aerodynamic structure according to claim 19, including stabilizing struts which extend between said stationary mounting bar member and said movable mounting bar member.

22. An aerodynamic structure according to claim 19, wherein said movable bar member includes vertical support members positioned behind said plastic board-like member to support said board-like member in a horizontal direction.

* * * * *